F. H. ABEEL.
Dumping-Trucks.
No. 141,098.
Patented July 22, 1873.
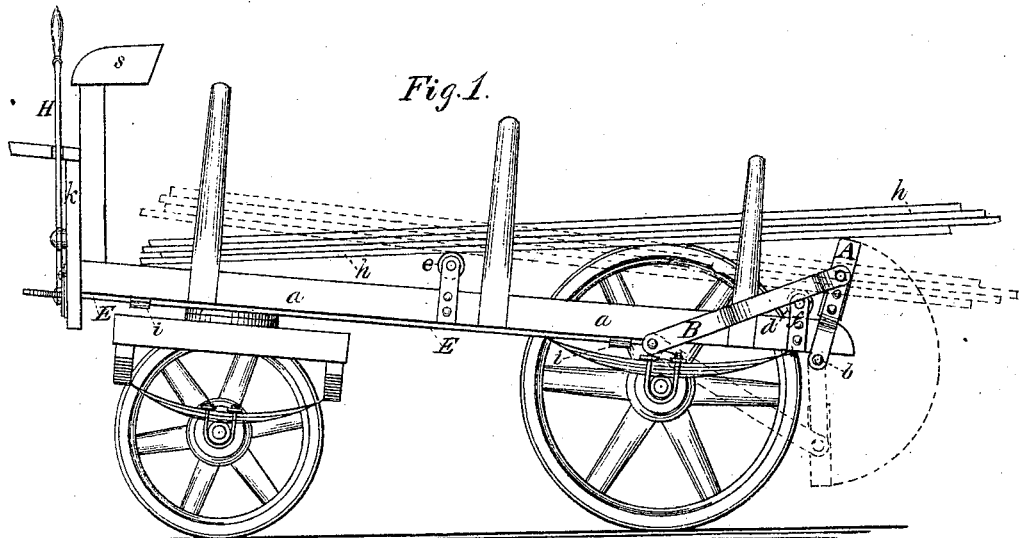
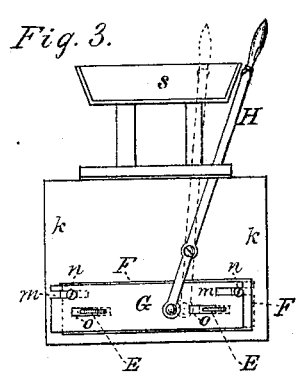
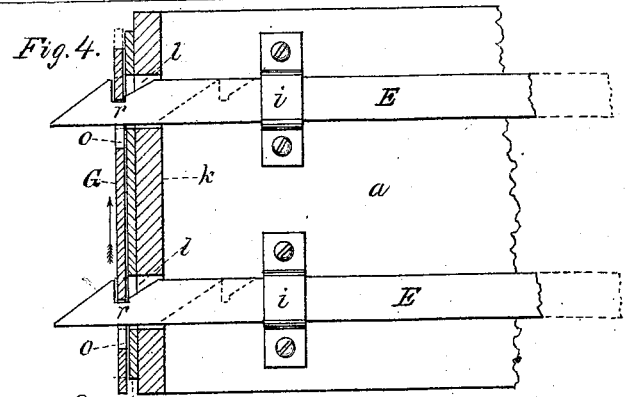
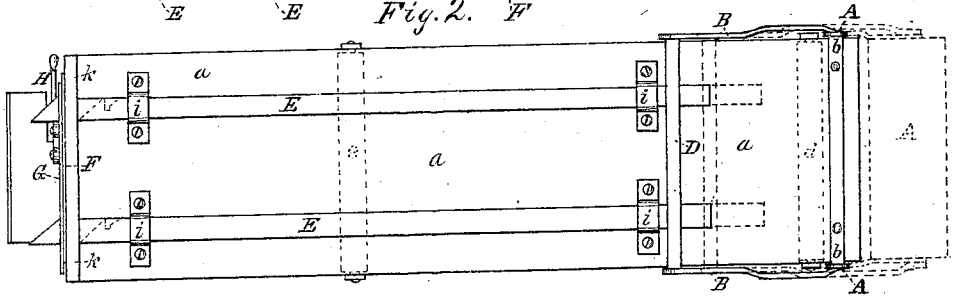
Witnesses:
Chas M Higgins
Arthur C Fraser
Inventor:
Frederick H. Abeel
per Burke & Fraser,
attys.

UNITED STATES PATENT OFFICE.

FREDERICK H. ABEEL, OF NEW YORK, N. Y.

IMPROVEMENT IN DUMPING-TRUCKS.

Specification forming part of Letters Patent No. 141,098, dated July 22, 1873; application filed May 24, 1873.

*To all whom it may concern:*

Be it known that I, FREDERICK H. ABEEL, of the city, county, and State of New York, have invented an Improved Dumping-Truck, of which the following is a specification:

The object of this invention is to produce an improved dumping-truck adapted to conveying iron, or other material in bars or rods of considerable length, by which the same may be automatically unloaded or dumped at one operation without necessitating the separate handling of each piece; and it consists of a hinged tail-board, on which the load partly rests, in combination with locking mechanism, by which said tail-board is held in an upright position while the load is being transported and released, or allowed to fall when it is desired to dump the load; in the mode of connecting the tail-board with the locking mechanism; and in rollers in combination with said tail-board.

Figure 1 of the accompanying drawing is a side elevation of the improved dumping-truck, the wheels nearest the observer being removed. Fig. 2 is a plan view of the under side of the floor of the truck, showing how the hinged tail-board is connected with the locking mechanism, the wheels, axles, &c., being removed. Fig. 3 is an elevation of the front portion or dash-board of the truck, showing the locking mechanism attached thereto, and the mode of operating the same. Fig. 4 is a fragmentary plan view, on an enlarged scale, of the under side of the floor of the truck, showing the locking mechanism in section, and its mode of operation.

As shown in the drawings, *a a* is the floor or body frame of the truck, which inclines toward the rear, as usual. At the rear end of the floor is arranged the tail-board A, hinged or pivoted securely at *b*, Figs. 1 and 2, and placed in a nearly upright position, inclining slightly backward. Immediately in front of the tail-board A, and extending across the floor of the truck, is arranged a roller, *d*, close to the floor *a a*, and supported in the bearings *f f*, Figs. 1 and 2. At or near the center of the truck is a second roller, *e*, elevated slightly above the floor *a a*, as shown in Fig. 1. To each side of the tail-board is attached an arm or rod, B, Figs. 1 and 2, which connects it with a cross-bar, D, Fig. 2, extending across the under side of the floor *a a*. The bar D is securely attached to two sliding rods, E E, which extend along the under side of the floor *a a* and through openings in the dash-board *k*. The ends of the rods E E are inclined and recessed or hooked, and the rods are free to slide in the boxes or guides *i i*, as shown in Figs. 2 and 4. The dash-board *k* projects a short distance below the floor of the truck, as shown in Fig. 1, and extending across its lower part is secured a fixed plate, F, through which and the dash-board *k* openings or slots *l l*, Fig. 4, are formed, to allow the hooked ends of the rods E to pass through. In front of and upon the fixed plate F is arranged a sliding plate, G, supported and guided by the slots *m m* and bolts *n n*, Fig. 3, and connected with the lever H, as shown in Fig. 3. In the plate G are also cut slots *o o*, equal in size to the slots *l l* or to the width of the rods E E, as shown in Fig. 4. The plate G is free to slide laterally, and is operated by the lever H, which extends upward toward the seat *s* in a convenient position to be readily operated by the hand of the driver.

When the tail-board is in an upright position, as in Fig. 1, the rods E E will be in the position shown by the full lines in Fig. 4, the recesses *r r* being on a line with the plate G, and by moving the plate to one side, into the position shown by the full lines in Figs. 3 and 4, the plate will enter the recesses *r r* and securely lock the rods E E and hold the tail-board A in an upright position; and when it is desired to allow the tail-board to fall, the lever H is moved into the position shown by the dotted lines in Fig. 3, which brings the plate G into the position represented by the broken lines in Figs. 3 and 4, and the slots *o o* and *l l* on a line with each other and the bars E E, and thus release the latter and allow the tail-board A to fall.

In loading the truck the load is so disposed that the tail-board A bears a considerable portion of it, as will be understood on reference to Fig. 1, where it will be seen that the bars of iron *h h* rest partly on the floor *a a*, roller *e*, and tail-board A, the bars being in a nearly horizontal position, inclining slightly toward the front of the truck.

When the driver desires to dump the load, after placing the truck in the desired position, he moves the lever to the right to unlock or release the bars E E, as before explained, when the tail-board A will at once fall by its own weight and by the weight of the load which it partly supports, and assume the position represented by the broken lines in Fig. 1. The outer ends of the bars $h\,h$, being then unsupported, will fall onto the roller $d$, and the front ends rise, assuming the position represented by the broken lines. The bars $h\,h$, being then supported by the rollers $e\,d$ only, and on a downward incline, will slide rapidly off the truck in one mass, and be dumped in the desired locality.

The roller $e$ is preferably formed of steel to more effectually resist the blows of the falling load, and to preserve its rotundity intact.

It is obvious that my improved dumping-truck is as well adapted for lumber or other long objects as it is for bars or rods of iron.

Instead of the two rods E E, only one may be used with equivalent effect, and the lever H may be placed at one side of the truck and suitably connected with the plate G, so that the iron or lumber, or other goods, may project forward, if necessary.

By my improved truck the slow and laborious process of unloading each separate bar or rod of iron by hand is entirely obviated, as well as the obstruction of the thoroughfare caused by trucks having to remain for a length of time in one position while being unloaded, as by my invention the truck is unloaded in a few seconds by a mere movement of the hand and without any additional labor.

I claim as my invention—

1. In a dumping-truck, the hinged tail-board A, arranged to partly support the load, in combination with the locking mechanism B E G H, or its equivalent, for holding or releasing the tail-board, substantially as set forth.

2. The arms B B, rods E E, slotted plate G, and lever H, in combination with the tail-board A, substantially as and for the purpose herein set forth.

3. The roller $d$ and elevated roller $e$, in combination with the tail-board A, substantially as shown and described.

In witness whereof I have hereunto signed my name in the presence of two subscribing witnesses.

FREDERICK H. ABEEL.

Witnesses:
H. B. WHEATCROFT,
JONA. AUSTIN.